(12) United States Patent
Cheng et al.

(10) Patent No.: US 9,094,561 B1
(45) Date of Patent: Jul. 28, 2015

(54) FRAME INTERPOLATION AND MOTION VECTOR RECONSTRUCTION

(75) Inventors: Guohua Cheng, Shangai (CN); Neil D. Woodall, Newport Beach, CA (US); Bob Zhang, Santa Clara, CA (US); Xiaojie Sheng, Shanghai (CN)

(73) Assignee: PIXELWORKS, INC., Portland, OR (US)

( * ) Notice: Subject to any disclaimer, the term of this patent is extended or adjusted under 35 U.S.C. 154(b) by 894 days.

(21) Appl. No.: 13/327,645

(22) Filed: Dec. 15, 2011

Related U.S. Application Data

(63) Continuation of application No. 12/970,808, filed on Dec. 16, 2010, now abandoned.

(51) Int. Cl.
*H04N 7/01* (2006.01)
*H04N 19/61* (2014.01)

(52) U.S. Cl.
CPC ............... *H04N 7/014* (2013.01); *H04N 19/61* (2014.11)

(58) Field of Classification Search
None
See application file for complete search history.

(56) References Cited

U.S. PATENT DOCUMENTS

| | | | |
|---|---|---|---|
| 8,184,200 B1* | 5/2012 | Biswas et al. | 348/459 |
| 8,477,848 B1* | 7/2013 | Patankar et al. | 375/240.16 |
| 2002/0186889 A1* | 12/2002 | De Haan et al. | 382/236 |
| 2003/0194151 A1* | 10/2003 | Wang et al. | 382/300 |
| 2003/0202605 A1* | 10/2003 | Hazra et al. | 375/240.26 |
| 2004/0179594 A1* | 9/2004 | Biswas et al. | 375/240.2 |
| 2005/0259738 A1* | 11/2005 | Horishi et al. | 375/240.16 |
| 2006/0193535 A1* | 8/2006 | Mishima et al. | 382/294 |
| 2009/0161010 A1* | 6/2009 | Tran et al. | 348/441 |

* cited by examiner

*Primary Examiner* — Sath V Perungavoor
*Assistant Examiner* — Peter D Le
(74) *Attorney, Agent, or Firm* — Marger Johnson & McCollom PC

(57) ABSTRACT

An apparatus has a motion vector estimation module to perform motion vector estimation on a current frame and on a previous frame of image data to produce a current phase and a previous phase, a motion vector generation module to generate motion vector fields for the current and previous phases, and a motion vector interpolation module to find interpolated motion vectors for an interpolated phase that have minimal differences between motion vectors in the current and previous motion vector fields and to product interpolated motion vectors.

18 Claims, 9 Drawing Sheets

FRAME INTERPOLATION AND MOTION VECTOR RECONSTRUCTION

CROSS-REFERENCE TO RELATED APPLICATIONS

This application is a Continuation of co-pending U.S. application Ser. No. 12/970,808, filed Dec. 16, 2010, entitled FRAME INTERPOLATION AND MOTION VECTOR RECONSTRUCTION, the disclosure of which is herein incorporated by reference in its entirety.

BACKGROUND

Frame interpolation creates an image frame from neighboring images. The neighboring images may be fields in an interlaced video format, used to form a frame of data, or neighboring frames of a soon-to-be-created frame. Higher frame rates are generally desirable.

In the simplest approach, one could increase the frame rate by repeating the most recent frame until the next frame is ready for display. However, this does not account for moving objects which may appear to jump from frame to frame and have flickering artifacts instead of the appearance of smooth motion.

Motion estimation and motion compensation techniques may alleviate many of these issues. These techniques rely upon motion vectors to shift the image data for the moving object to the correct position in interpolated frames, thereby compensating for the motion of the object. Difficulties arise in the estimation of motion and the selection of the correct motion vector in the regions of the image where the moving object resides. These regions may have background areas that are initially uncovered in the background, but become covered by the object in motion. Similarly, these background regions may be initially covered by the object, and then become uncovered as the object moves away. In either case, selection of motion vectors becomes difficult. These regions will be referred to as 'occluded.'

The difficulties arise because no matching block can be found in the occluded regions for an image at a first time to an image at a second time. This typically leads to selection of the incorrect motion vector. The coincidence of the selection of the correct motion vector complicates the frame interpolation process, since that process typically uses data from two frames, but only one of the frames has the correct information. It becomes difficult to identify which is the proper frame.

DETAILED DESCRIPTION OF THE EMBODIMENTS

Figure 1:
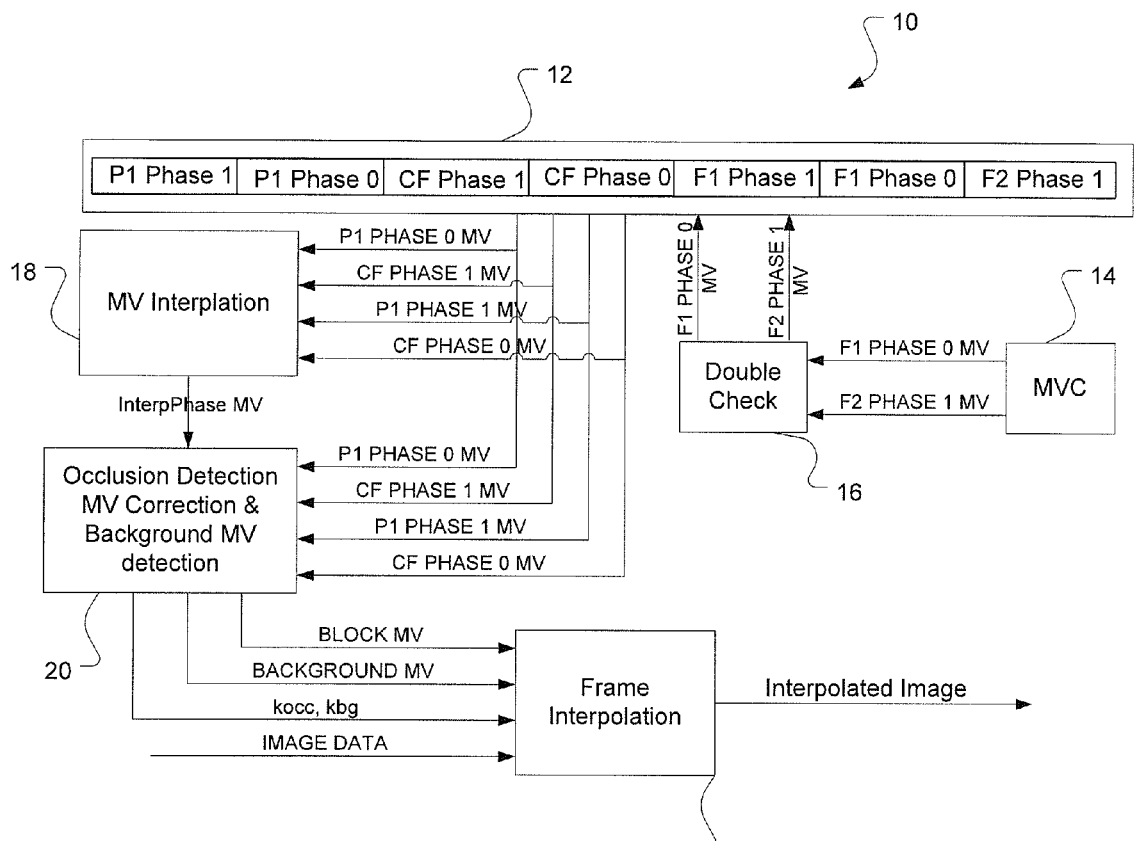
FIG. 1 shows an embodiment of a motion estimation and motion correction apparatus.

FIG. 1 shows an embodiment of a motion estimation and motion correction apparatus 10. The apparatus includes a frame memory 12 that contains motion data and other descriptive information for various phases frames of image data. A 'phase' as used here means the fraction of time from the previous frame to the next frame of image data where the motion vectors and other data were calculated. For example if the motion vector data is being calculated between the current frame (CF) and the previous frame (P1), then motion vector data that is referenced to the spatial postions in the previous frame would be considered the phase ( ) data.

In a typical Phase Plane Correlation (PPC) process, the current frame (CF) and the previous frame (P1) have undergone Fourier transformation to the phase plane. PPC lends itself well to motion analysis because motion in images appears in the Fourier plane as large peaks. However, there is no information on which motion vector belongs to which pixels or groups of pixels. The PPC process also calculates motion vectors that are independent of the two reference frames. That is, they are valid for both phases. In one embodiment, the PPC results are used as candidates in a 3D recursive motion vector search algorithm. The 3D recursive algorithm is typically block based, so there is an implied starting block and ending block for the process. Therefore, even if algorithm was perfect, the MV found for different phases could be different even though the spatial position and two frames being used are the same. As designated here, the phase from a current frame to a previous frame, such as from CF to P1 is Phase1, CF Phase 1 for example. The phase from the previous frame to the current frame is designated as Phase 0, such as P1 Phase 0. Further, CF is the previous frame to F1, and F1 is the previous frame to F2. The frame memory 12 stores the data for these various phases.

Prior to the interpolation of the motion vector performed here, generally some technique is used to identify potential areas in the image data that are cover/uncover areas, also referred to occluded areas. In this particular embodiment discussed here, motion vector confirmation is performed by a motion vector module 14. The resulting motion vector is double confirmed at module 16. The apparatus will rely on this data further on in the processing. A module as that term is used here may be a set of processing elements on one or more semiconductor chips, a set of instructions to be executed by a processor stored in non-transitory computer readable media, and any combination thereof.

The MV Interpolation module 18 will interpolate motion vectors for the interpolated phase. The interpolated phase is a phase that is generated either between phase 0 and phase 1, or may reside at phase 0 or phase 1. The interpolated phase will ultimately be used to generate interpolated frames of image data to increase the frame rate for display.

The MV Interpolation module 18 produces the motion vectors for the interpolated phase and provides them to the Occlusion Detection module 20. The discussion here will focus on these two modules and methods of performing the processes of motion vector interpolation, occlusion detection, motion vector correction and background motion vector detection. The resulting data is then provided to the Frame Interpolation module 22 with the original image data, resulting in interpolated image data.

As mentioned above, an initial process generally involves phase plane correlation to aid in motion detection. Once the PPC process completes, the process performs motion analysis by generating a set of candidate motion vectors for each block of the interpolated frame. These candidate motion vectors may result from many different processes, such as three dimensional recursive analysis. A prospective interpolated motion vector will then typically be selected from the set of candidate motion vectors such as by block matching or motion vector smoothing. The selected motion vector must undergo testing to ensure an accurate fit.

Figure 2:
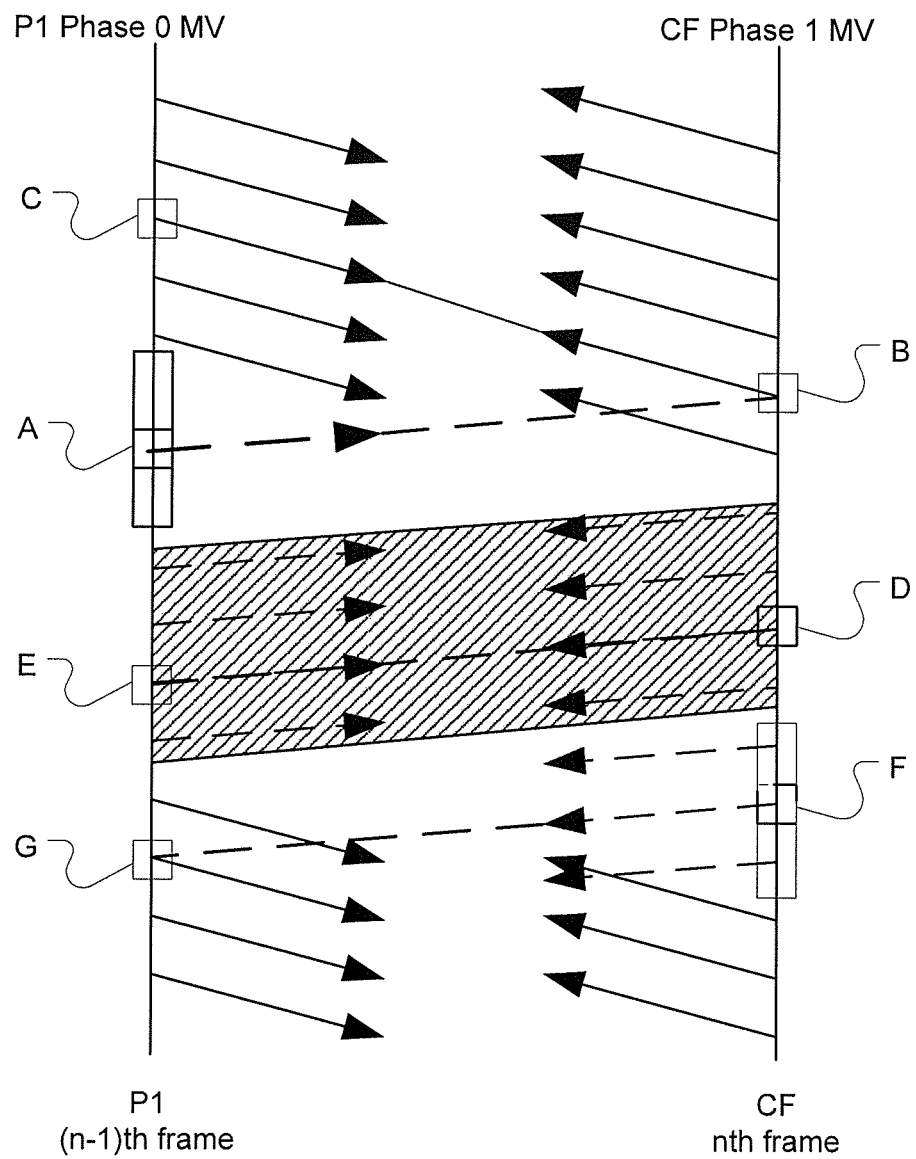
FIG. 2 shows an example of blocks in image data having motion vectors.

One issue that arises in motion vector selection occurs in areas of the image where a foreground object moves between frames or phases. In one phase a particular block or region of the data may have a motion vector associated with a moving object, and in the next phase, that block or region may have a motion vector for the background. The alternative may also be true. These regions may be referred to here as cover/uncover regions or occluded regions. FIG. 2 shows an example of such a situation.

FIG. 2 shows a motion vector field between a previous frame and a current frame, in this instance P1 frame and the CF frame. P1 Phase 0 MV is phase 0 motion vector field from P1 to CF, and CF Phase 1 MV is phase 1 motion vector field from CF to P1. Dashed line arrows such as 24 indicate foreground motion vectors and solid line arrows indicate background motion vectors such as 26.

Many different techniques may be used to identify occluded regions. The following discussion provides a summary of a method referred to as motion vector double confirmation. A more detailed discussion can be found in U.S. patent application Ser. No. 13/327,634.

Figure 3:
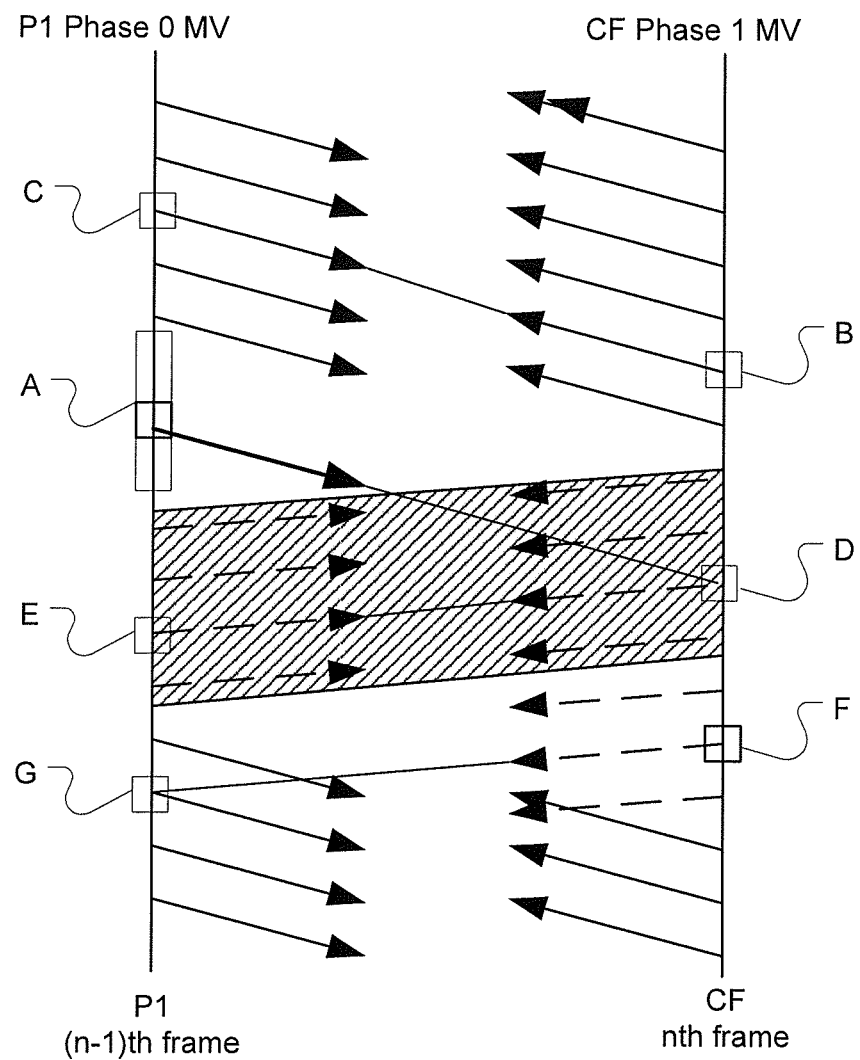
FIG. 3 shows another example of blocks in image data having motion vectors.

Referring to FIGS. 2 and 3, one can see that for normal regions with no occlusion, the motion vectors from one phase to the other have very little differences. For example, looking at blocks B, C, D and E in FIG. 2, one can see that the motion vectors for these blocks point towards each other. Specifically, looking at block C in P1 Phase 0, its motion vector points to block B in CF Phase 1. Block B in CF Phase 1 has a motion vector pointing to block C in P1 Phase 0. Blocks D and E have the same situation, except that their motion vectors are foreground motion vectors, designated with dashed lines. The region between these two blocks, designated with hatching, is a region using foreground motion vectors. When the motion vectors for these blocks are compared, there is very little difference between them and the motion vectors may be referred to as being 'double confirmed.'

However, looking at blocks A and F, one can see a different situation. Block A in P1 Phase 0 has a motion vector that points to block B in CF Phase 1. However, as discussed above, block B's motion vector points to block C in P1 Phase 0. As a result, A's motion vector is not double confirmed and A becomes identified as an occluded region. A similar situation exists for block F. Block F points to block G in CF Phase 1, but block G's motion vector points in a different direction in P1 Phase 0. F's motion vector is therefore not double confirmed.

FIG. 3 shows another example of motion vector fields for phase 0 and phase 1. Blocks A and F again do not have motion vectors that double confirm. Block A's motion vector from phase 0 points to block D, but block D's motion vector points to block E in phase 1. One should note that block D's motion vector does double confirm with block E, since block E's motion vector point to block D. Block F has a similar situation, where its motion vector points to block E, but block E's motion vector does not point towards block F.

An example calculation for a value of the motion vector double confirm (MVDC) may be:

P1_Phase_0_MV[A].mvdiff=abs(P1_Phase0_MV[A].x−CF_Phase1_MV[B].x)++Abs(P1_Phase0_MV[A].y−CF+Phase1_MV[B].y).

Here B is a block hit by A's MV in CF_Phase1_MV. A small value means that the motion vectors are close to each other and double confirmed. A similar process would then apply to B, using B and C values.

Since the two phases are relied upon for the interpolated phase, selection of the wrong motion vector for these regions may lead to objectionable artifacts in the interpolated image data. The blocks that have motion vectors not double confirmed are identified as occluded regions and will undergo further processing in the frame interpolation motion vector process.

The frame interpolation motion vector process begins with interpolating a phase between phase 0 and phase 1. A common solution will typically do motion estimation between phase 0 and phase 1 at the interpolated phase to generate the motion vector field for the interpolated phase. One embodiment discussed here interpolates the motion vector field based on the motion vectors at phase 0 and phase 1.

Once the motion vector field is generated for phase 0 and phase 1, which may be accomplished as part of the process of identifying occluded regions as discussed above, the process finds a motion vector for each block of the interpolated phase. In one embodiment, a search finds the motion vector having a minimal distance between the P1 and CF motion vector fields.

Figure 4:
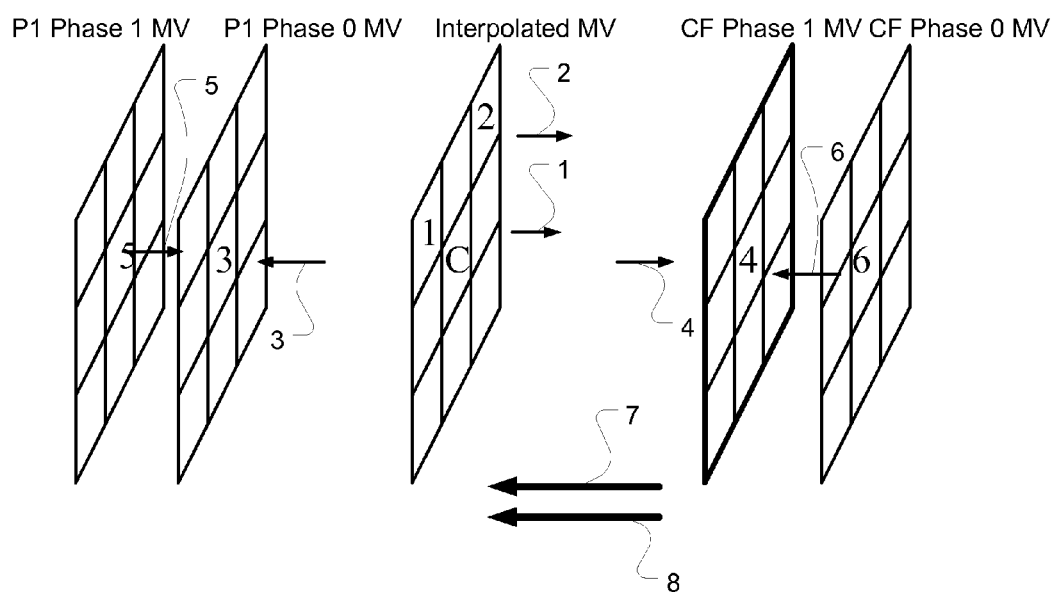
FIG. 4 shows an embodiment of selection of candidate motion vectors.

A search window may be defined to cover a motion vector search range. In one embodiment 8 candidate motion vectors are used to find the motion vector that has a minimal hit distance between the interpolated phase motion vector and the P1 and CF phase motion vectors. FIG. 4 shows a search window to find a best motion vector for block C in the interpolated phase motion vector field.

The 8 candidate motion vectors include candidate 1, the motion vector from the top left block of the interpolated phase; candidate 2, the motion vector from the top right block of the interpolated phase; candidate 3, the motion vector for the corresponding block position in P1 Phase 0; candidate 4, the motion vector for the corresponding block position in CF Phase 1; candidate 5, which comes from 3×3 window in P1 Phase 1 motion vector field, and it has large difference with candidate 3 and has small mvdiff value; and candidate 6, which comes from 3×3 window in CF Phase 0 motion vector field, and it has large difference with candidate 4 and has small mvdiff value. Two other candidate motion vectors 7 and 8, two local global motion vectors. The global motion vectors result from the original PPC process referred to above and are the motion vectors for regions larger than the block, for example such as the CF Phase 1 region. Using 8 candidates reduces the number of components needed, and results in faster operation than using more candidates would, still with high accuracy and confidence in the correctness of the selection.

Using those 8 candidates, one can project the motion vector projections from the current block C's position. Each candidate motion vector will get hit positions, or the blocks to which they point, in P1 Phase 0 and CF Phase 1. The motion vector difference between the candidate motion vector and both of the phases can then be found. The 'hit distance' is the distance between the candidate motion vector and the motion vector from the position to where the candidate motion vector hits or points in a phase.

One could designate the distance between the candidate motion vector and the motion vectors from the points to where the candidate motion vector points as hitdist_p1[i], and hitdist_cf[i], respectively for P1 phase 0 and CF phase 1, where i designates the number of the candidate motion vector. Comparing these hit distances, one would identify the minimal hit distance in P1 phase0 side and CF phase 1 side respectively. These would be designated as minhitdist_p1 and minhitdist_cf.

A weighting factor w could then be calculated:

$$w=\max(0,\min(64,32+k*(\text{minhitdist\_cf}-\text{minhitdist\_p1})/64)).$$

This weighting is then applied to each candidate motion vector to arrive at its weighted hit distance:

$$\text{weighted\_dist}[i]=\text{hitdist\_p1}[i]+(64-w)*(\text{hitdist\_cf}[i]-\text{hitdist\_p1}[i])/64.$$

This result is then used to select the motion vector with the minimal weighted hit distance as the motion vector for the block at the interpolated phase.

Using the selected interpolated motion vector, one can then refer back to the identification of occluded regions to perform further processing. As mentioned before, the technique used here involves double confirmation of motion vectors between phases. However, any method of identifying potentially occluded areas may be used.

After identification of a region as occluded, one can then more specifically identify the region as cover or uncover. In a cover region, the interpolated block motion vector will point to a block in P1 Phase 0 not double confirmed, and to a block in CF Phase 1 that is double confirmed. In an uncover region, the interpolated motion vector points to a block in double confirmed block in P1 Phase 0 and a block that is not double confirmed in CF Phase 1.

Figure 5:
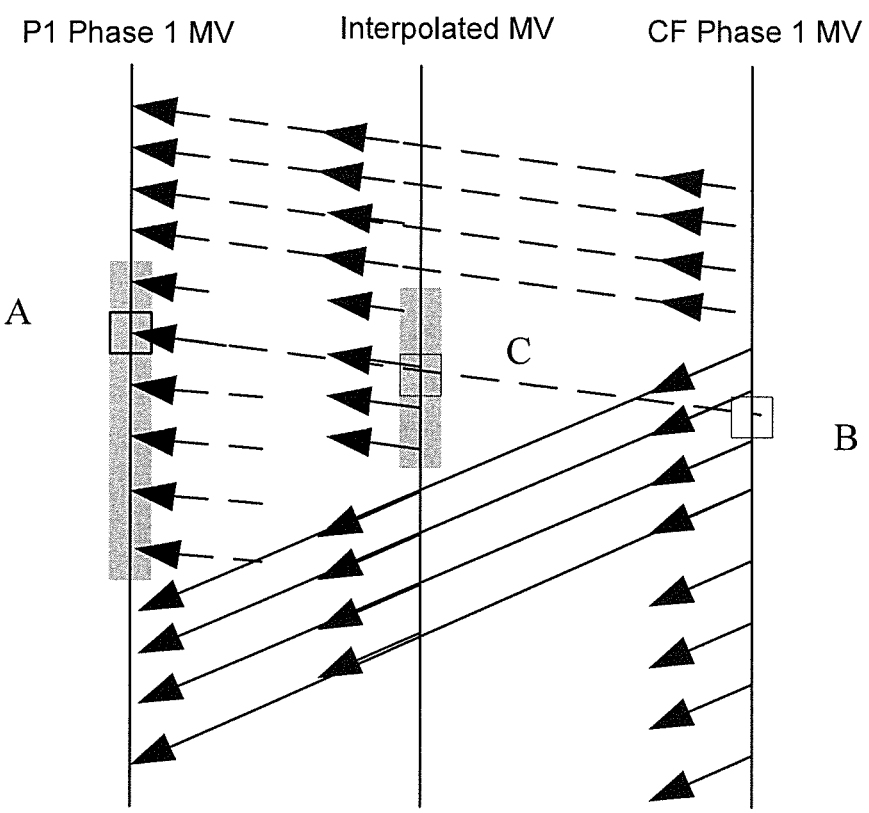
FIG. 5 shows a diagram of an embodiment of an occlusion confidence measure.

Referring to FIG. 5, the occlusion confidence measure can be calculated for a particular block in the interpolated motion vector field:

$$k\text{occ}=k2*\max(0,P1\_\text{phase\_0MV}[A].\text{mvdiff}-\text{CF\_Phase1\_MV}[B].\text{mvdiff}).$$

The parameters k1 and k2 are the parameters for gain control. The variables P1_Phase0_MV[A].mvdiff and CF_Phase1_MVP[B].mvdiff are the motion vector double confirmation measures calculated during the process to identify regions as occluded. These are the distances between the motion vectors pointing to a particular block and the motion vector from that particular block pointing back towards the other phase. If the occlusion measure kocc is larger than zero, the block is identified as a cover block. If the measure is less than zero, the block is identified as an uncover block.

Figure 6:
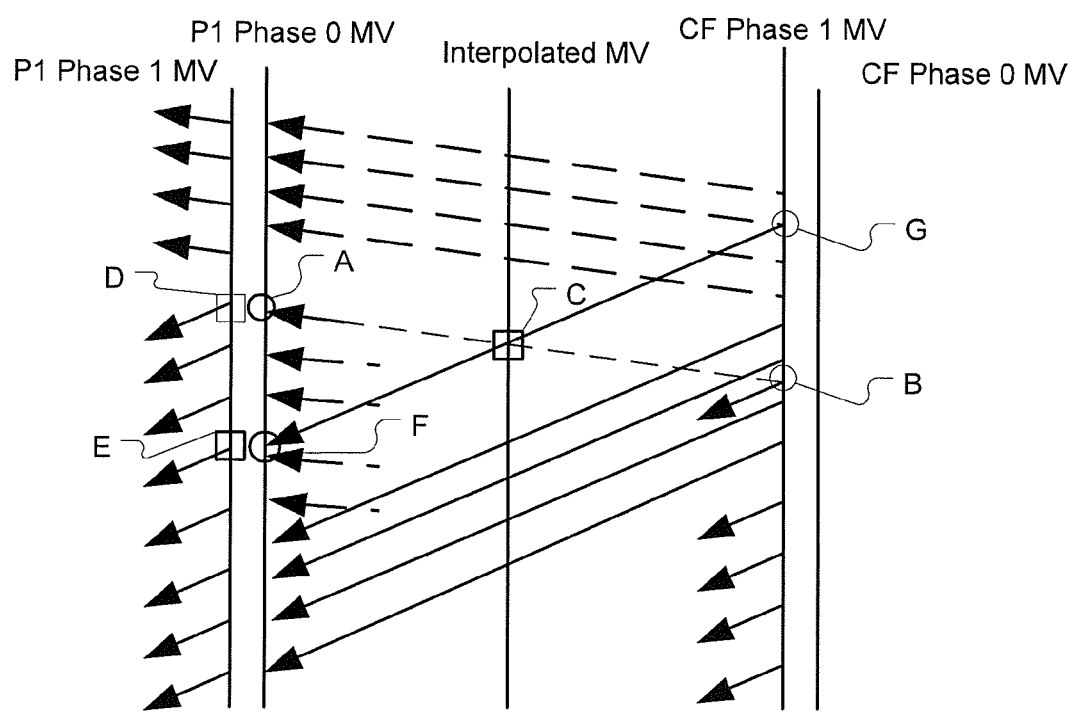
FIGS. 6 and 7 show examples of background motion vectors detected on an interpolated phase.

Although detecting blocks as cover/uncover blocks in the interpolation phase, one still needs to ensure that the correct motion vector is selected. Using a process of motion vector correction, one can find those blocks that have large motion detection double confirmation value and correct the motion vectors as needed. Typically, for a cover block, the process will check the motion vectors in P1 Phase 1, P1 Phase 0 and CF Phase 1. For an uncover block, the process will check P1 Phase 0, CF Phase 1 and CF Phase 0. FIG. 6 shows an example.

Block C has an occlusion confidence measure that is greater than 0 and is a cover block. Using the selected motion vector from the FI interpolation stage, it hits block D in P1 Phase 1 and A in P1 Phase 0, and block B in CF Phase 1. Using D's motion vector, or a previously identified background motion vector, and projecting it from the interpolated phase at C towards P1 Phase 1 and 0, one gets a motion vector that points at block E. This will result in a large value for the motion vector double confirm. However, if one were to then take E's motion vector and project from C towards CF Phase 1, there would be a very small value.

One can replace the motion vector for block C with the motion vector of E when one the following conditions are met:

(1) The blocks B, D and E are double confirmed and max (P1_Phase1_MV[d].mvdiff, max(P1_Phase1_MV[B].mvdiff, P1_Phase1_MV [E].mvdiff)) <k3*P1_Phase0_MV[A].mvdiff (2) The motion vector for D is closer to the motion vector of E than the current motion vector for C; and (3) The motion vector for D is closer to the motion vector of B than the current motion vector for C.

This process results in corrected motion vectors being selected as needed. Generally, this process will only apply to regions with large motion vector double confirm values. The above process was for the cover region, but a similar process can also occur for the uncover regions.

Up to this point, the process has resulted in selection of the correct motion vector and generation of the occlusion confidence measure kocc. A halo effect may arise as another issue in interpolated frames. One method to reduce it involves identifying a background motion vector and using it to filter the data. Typically, the regions that reside within a cover region or an uncover region will have a zero background motion vector. One can detect the background motion vector in regions near the foreground object.

In one embodiment, the background motion vector for a cover block is detected based upon P1 Phase 1, P1 Phase 0 and CF Phase 1 motion vectors. For example, one can search for a double confirmed motion vector that hits current block C from P1 Phase 1, but hits a block with different double confirmed motion vector in CF Phase 1, and at the same time hits a block with large mvdiff value in P1 Phase 0. In FIG. 6, the solid line arrow from block C would be detected as the background motion vector when block E and G have double confirmed motion vector, and block F is not a double confirmed block. For uncovered regions, the background motion vector is detected using P1 Phase 0, CF Phase 1 and CF Phase 0. For example, one can search for a double confirmed motion vector that hits current block from CF Phase 0, but hits a block with different double confirmed motion vector in P1 Phase 0.

Figure 7:
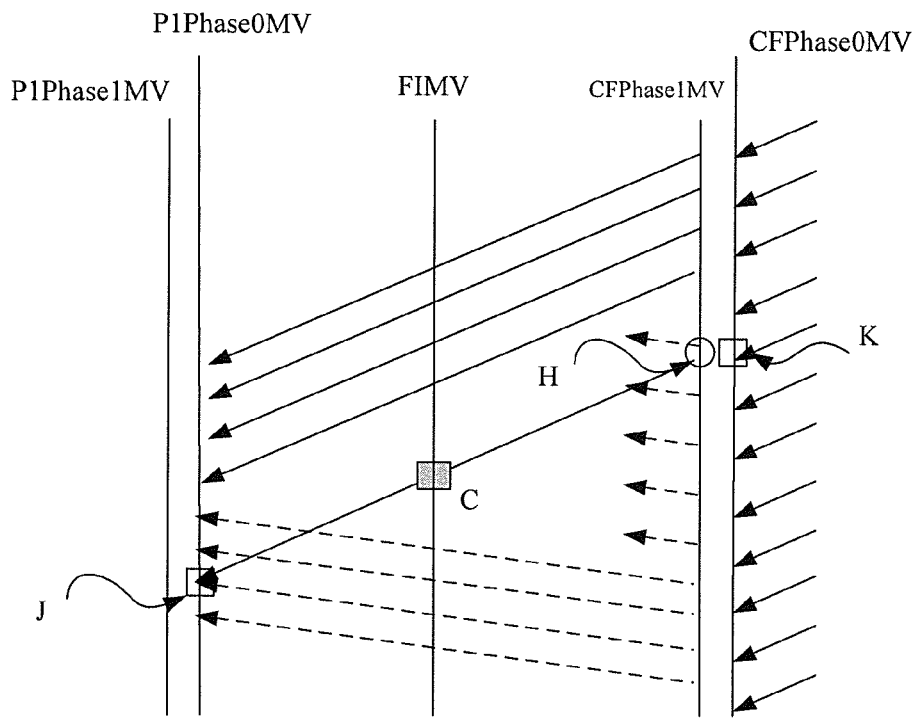

In FIG. 7, the solid line arrow from block C would be detected as the background motion vector when block K and J have double confirmed motion vectors, and block H does not have a double confirmed motion vector. For the block whose kocc value equals to zero, one would perform background motion vector detection use P1 Phase 1, P1 Phase 1 and CF Phase for odd position block. One would then perform background motion vector detection using P1 Phase 0, CF Phase 1 and CF Phase 0 for even position block. After background motion vector (bg_x, bg_y) detection for each block on interpolated phase, a value (bg_weight, which ranges from 0 to 1) will be used to denote the confidence of detected background motion vector according to motion vector and mvdiff value. Someone skilled in the art will realize that bg_weight does not need to be limited to values between 0 and 1 and can also take on limited discrete values, for example 0 and 1. For example in FIG. 6, the solid arrow for block C has high confidence when block E and G's motion vector have small mvdiff values, and block F's motion vector has large mvdiff value. And block E's motion vector can hit current block C. otherwise, we will decrease the confidence of background motion vector.

In one embodiment, the background motion vector detected at each block will processed again to get a stable result. First, sum the bg_weight of background motion vector in 5×7 window, and gets sum_bg_weight. Second, sum the background motion vector in 5×7 window and get the averaged background motion vector according to the their confidence.

$$bg\_MV.x = \text{sum}(bg\_x * bg\_\text{weight}) / \text{sum}(bg\_\text{weight})$$

$$bg\_MV.y = \text{sum}(bg\_y * bg\_\text{weight}) / \text{sum}(bg\_\text{weight})$$

Finally, if the sum_bg_weight of background motion vectors is larger than a threshold, the background motion vector is considered to be confident. The motion vector which close to average background motion vector as the background motion vector for current block. If the sum of the background motion vector confidence (sum_bg_weight) is smaller than a threshold, one would take the zero motion vector or global background motion vector as the background motion vector.

Another way to do background motion vector detection is, do background motion vector detection on phase 0 and phase 1 instead of interpolated phase. After one gets background motion vector on phase 0 and phase 1, take the background motion vector in P1 and CF side in 5×7 window around the block hit by zero motion vector in the interpolated phase.

Background motion vector detection would be performed on P1 Phase 0 and CF Phase 1. One can then determine if the motion vector is a background motion vector according to double confirm. If the motion vector is double confirmed in P1 Phase 1 and cannot be double confirmed in P1 Phase 0, but it has a double confirmed motion vector in CF phase 1 with P1 Phase 1 motion vector, then one would take P1 Phase 1's motion vector as background motion vector.

Figure 8:
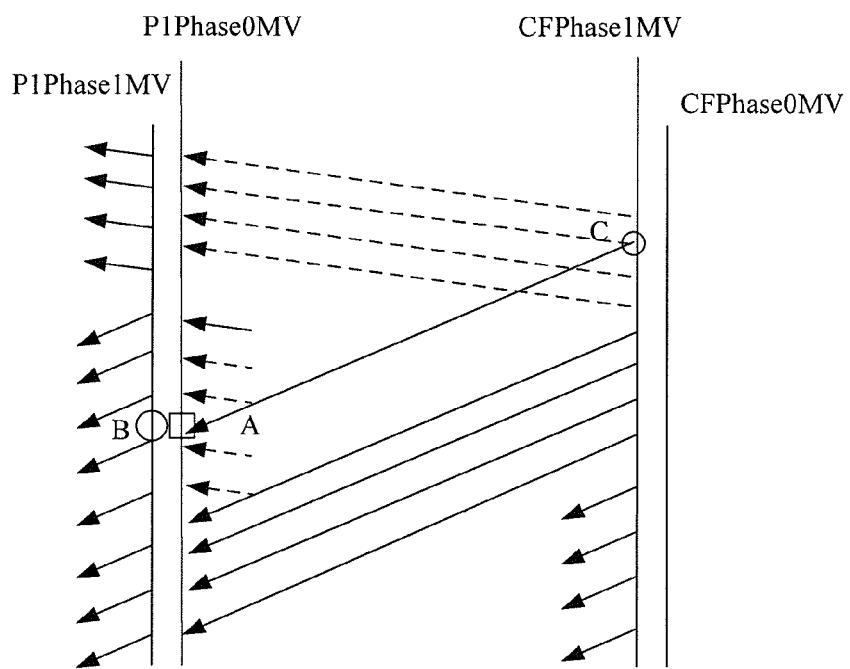
FIGS. 8 and 9 show examples of background motion vectors detected on a previous phase and a current phase.
Figure 9:
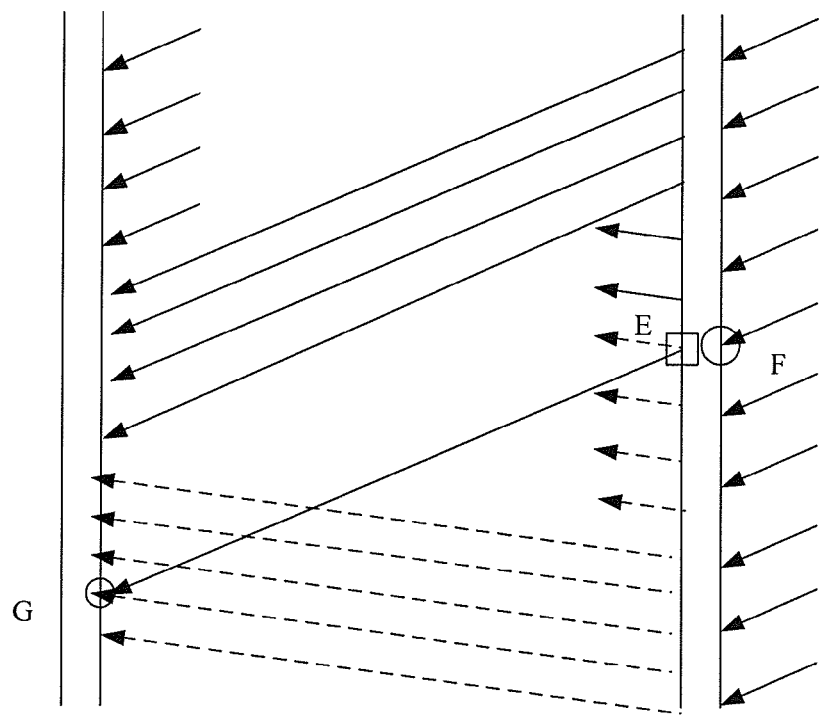

In FIG. 8 the solid line arrow from block A would be detected as the background motion vector for cover region if B and C are double confirmed blocks with different motion vectors and A is not a double confirmed block. In FIG. 9 the solid line arrow from block E would be detected as the background motion vector if block F and block G are different double confirmed blocks, and E is not a double confirmed block. For the detected background motion vector (bg_x and bg_y), we can assign a confidence (bg_weight) for each block's background motion vector according motion vector and mvdiff value.

After background motion vector detection in Phase 0 and Phase 1, calculate the background motion vector of FI phase by collecting background motion vector in 5×7 window on the P1 phase 0 and 5×7 window on CF phase 0, those two windows are got by using a 0 motion vector. Then one would use same method as discussed above to get weighted background motion vector for each block. If the sum of the background motion vector confidence (sum bg_weight) is smaller than a threshold, one would take the zero motion vector or global background motion vector as the background motion vector.

Of course, one can combine background motion vector detection in the interpolated phase and phase 0/1 both to get a more stable result.

To express the confidence measure of the background motion vector, a value kbg is introduced. Background motion vectors typically only become detectable around occluded regions. Occluded regions have kocc as their confidence measure. Therefore, kbg can result from low pass filtering of kocc to make sure ? it can cover blocks or region near the foreground object. Alternatives to low pass filtering include a dilation process or a dilation/erosion process.

Figure 10:
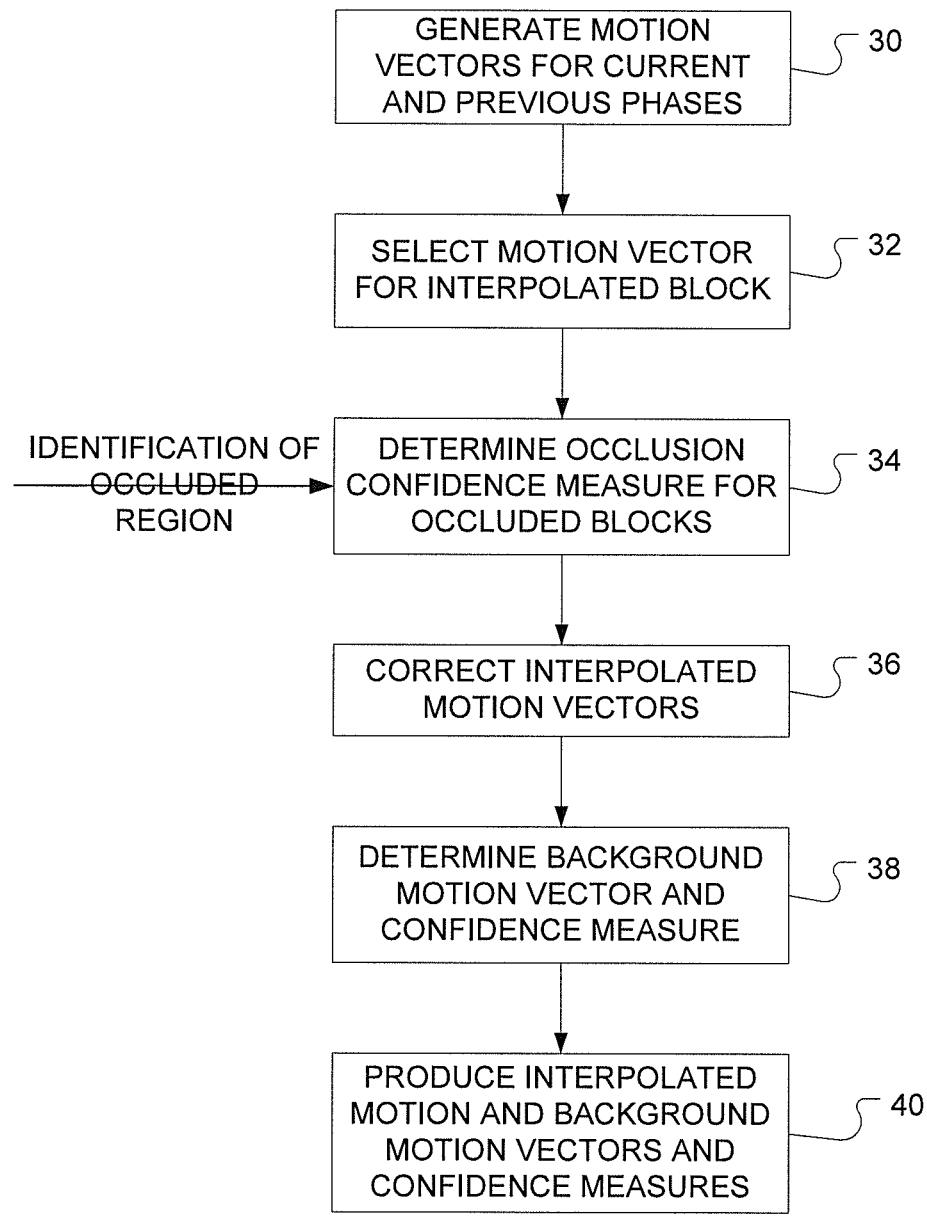
FIG. 10 shows a flowchart of an embodiment of a method of performing motion vector reconstruction for frame interpolation.

Referring to FIG. 10, one can summarize the process. At 30, the motion vectors for the current and previous phases are generated, such as for P1 Phase 0 and CF Phase 1. At 32, the process selects a motion vector for the interpolated block. In an embodiment given above, 8 candidate motion vectors underwent analysis and the one with the minimal weighted hit distance became the motion vector for the block.

At 34, the process uses an identification of regions as occluded. In one embodiment discussed above, regions were identified as being occluded based upon a failure to double confirm motion vectors between phase 1 and phase 0, but other techniques may be used. Referring back to FIG. 1, the MVC module performed this function in that embodiment. The process uses the occlusion identification to generate an occlusion confidence measure for each block, thereby designating the occluded blocks as cover or uncover areas. Occluded blocks then undergo a motion vector correction determination as needed at 36 in FIG. 10.

For the occluded regions, the process determines a background motion vector and a background motion vector confidence measure. Referring back to FIG. 1, the interpolated phase, the interpolated motion vector for the block, the background motion vector, the confidence measures for the background and occlusion and the image data are provided to the Frame Interpolation module 22. The Frame Interpolation module then produces the interpolated image data.

In this manner, an accurate method for determination of motion vectors for blocks of interpolated phases in image data is provided. The process has high accuracy and confidence, reduced costs and faster operation.

Thus, although there has been described to this point a particular embodiment for a method and apparatus for accurate selection of motion vectors for interpolated image data, it is not intended that such specific references be considered as limitations upon the scope of this invention except in-so-far as set forth in the following claims.

What is claimed is:

1. A method of providing motion vectors for an interpolated frame of image data, comprising:
   performing motion vector estimation on a current frame and on a previous frame of image data producing a current phase 1 pointing from the current frame to the previous frame and a previous phase 0 pointing from the previous frame to the current frame;
   generating at least two motion vector fields, one for the current phase and one for the previous phases; and
   finding interpolated motion vectors for an interpolated phase that have minimal differences between motion vectors in the current and previous motion vector fields.

2. The method of claim 1, further comprising generating an occlusion confidence measure for blocks of the interpolate frame based upon identification of the block as being occluded, where the occlusion confidence measure indicates whether a block is a cover block or an uncover block.

3. The method of claim 2, wherein generating the occlusion confidence measure uses a comparison of motion vectors between the current and previous phases.

4. The method of claim 1, further comprising correcting a selected interpolated motion vector for blocks of the interpolated as necessary, based upon the block being occluded.

5. The method of claim 4, wherein correcting a selected interpolation motion vector is only performed for blocks previously identified as occluded.

6. The method of claim 1, further comprising determining a background motion vector and an accompanying background confidence measure for blocks of the interpolated frame.

7. The method of claim 6, wherein determining a background motion vector use different motion vector field according for cover and uncover block.

8. The method of claim 6, wherein determining a background motion vector comprises:

projecting a block in the interpolated phase to the previous phase using a zero motion vector and collecting information about motion vectors surrounding the projected block in the previous phase;

projecting the block to a current phase using a zero motion vector and collecting information about motion vectors surrounding the projected block in the current phase;

using the information from both projections to determine whether local background information is reliable.

9. The method of claim 6, wherein determining a background motion vector comprises:

searching for a motion vector that hits a current block in the interpolated phase from a first phase, but hits a block with a different motion vector in a second phase and has a large motion vector difference value in a third phase;

designated the motion vector as the background motion vector; and assigning a confidence value to the background motion vector.

10. The method of claim 1, further comprising producing the interpolated motion vector to an interpolation module to accompany the image data.

11. The method of claim 1, further comprising identifying blocks of the interpolated frame as being occluded after generating motion vector fields for the current and previous phases.

12. The method of claim 11, wherein identifying blocks comprises comparing motion vectors between phases to produce a motion vector double confirmation measure.

13. The method of claim 12, further comprising identifying blocks as occluded if the measure has a high value relative to a threshold.

14. The method of claim 1, wherein finding interpolated motion vectors comprises identifying a search window of candidate motion vectors.

15. An apparatus, comprising:

a motion vector estimation module to perform motion vector estimation on a current frame and on a previous frame of image data to produce a current phase pointing from a current frame to the previous frame and a previous phase pointing from the previous frame to the current frame;

a motion vector generation module to generate at least two motion vector fields, one each for the current phase and the previous phases; and a motion vector interpolation module to find interpolated motion vectors for an interpolated phase that have minimal differences between motion vectors in the current and previous motion vector fields and to produce interpolated motion vectors.

16. The apparatus of claim 15, further comprising an occlusion detection module arranged to receive the interpolated motion vectors from the motion vector interpolation module and to determine if occluded areas are cover or uncover areas and produce an occlusion confidence measure.

17. The apparatus of claim 15, further comprising a motion vector correction module to correct interpolated motion vectors, and detect background motion vectors as needed.

18. The apparatus of claim 15, further comprising a frame interpolation module arranged to receive the interpolated motion vectors and the image data.

* * * * *